United States Patent [19]

Aldrink et al.

[11] 3,936,197

[45] Feb. 3, 1976

[54] SELF-LEVELING LASER ASSEMBLY

[75] Inventors: Larry D. Aldrink, Jenison; Edward G. Nielsen; Willard G. Vogelaar, both of Grand Rapids, all of Mich.

[73] Assignee: Laser Alignment, Inc., Grand Rapids, Mich.

[22] Filed: May 6, 1974

[21] Appl. No.: 467,372

[52] U.S. Cl. ................. 356/250; 356/149; 356/172
[51] Int. Cl.² ............................................. G01C 9/12
[58] Field of Search ............ 356/250, 149, 153, 172

[56] References Cited
UNITED STATES PATENTS

| | | | |
|---|---|---|---|
| 2,959,088 | 11/1960 | Rantsch | 356/250 |
| 3,013,464 | 12/1961 | Keuffel et al. | 356/250 |
| 3,588,249 | 6/1971 | Studebaker | 356/172 X |
| 3,684,381 | 8/1972 | Zoot | 356/138 |
| 3,781,121 | 12/1973 | Gross | 356/247 |

FOREIGN PATENTS OR APPLICATIONS 1,165,885  3/1964  Germany ............................ 356/250

*Primary Examiner*—Palmer C. Demeo
*Attorney, Agent, or Firm*—Price, Heneveld, Huizenga & Cooper

[57] ABSTRACT

Self-leveling light beam projection apparatus for projecting and maintaining a beam of light along a predetermined path relative to the earth's vertical. A housing adapted for mounting in a predetermined plane includes a light source such as a laser generator for generating a collimated beam of light. A lens system including a pendulum mounting at least one lens is mounted for movement about mutually perpendicular axes to seek the vertical and to maintain the projected beam along the predetermined path despite the relative positions of the housing and light source.

20 Claims, 3 Drawing Figures

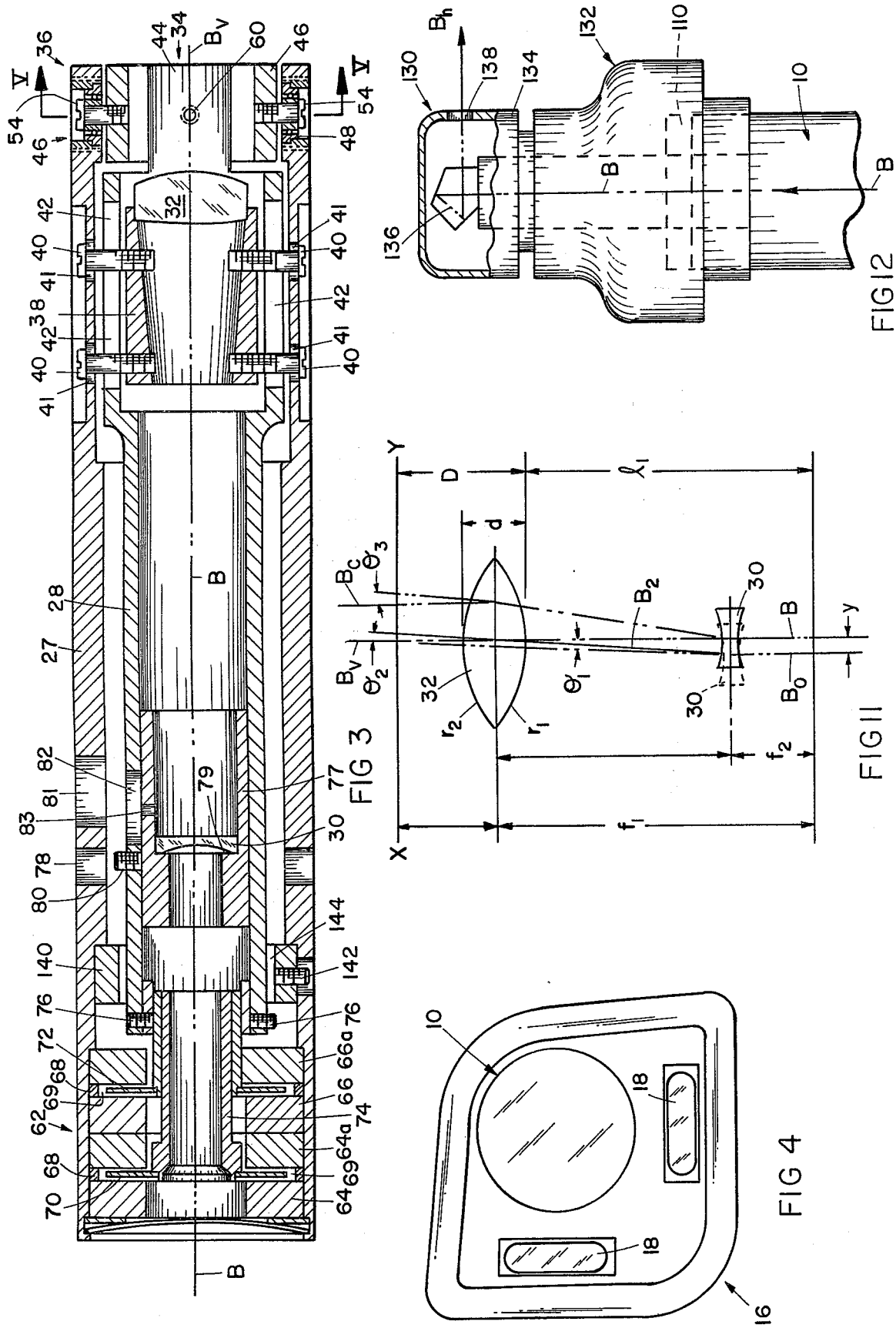

SELF-LEVELING LASER ASSEMBLY

BACKGROUND OF THE INVENTION

The present invention relates to light beam projecting devices and more particularly to a self-leveling laser beam projector particularly useful for construction, surveying, tunnelling and like applications.

Self-leveling laser devices are known in the prior art; however, they are extremely bulky in size and require generally a great number of components such that when the assembly is mounted, the light beam output will attain a true horizontal or a vertical position. Such prior devices have not been generally acceptable for field use as the extremely sensitive components required to provide the self-leveling feature will not withstand the extreme field conditions to which they were subjected. In some prior devices for maintaining a vertical or horizontal beam, the sensing components included gyroscopes, liquid lenses, pendulously supported light sources, and the like in an attempt to provide a true horizontal or vertical output beam. Additionally, in all prior art self-leveling projectors known to Applicant, the vertical, or horizontal, if a system of mirrors and/or prisms is used at the output, beam can only be provided in one plane of movement of the source. That is, if the projector is moved, for example, in a fore and aft direction and a vertical output is maintained, the apparatus will not accurately respond to movement to the left or right.

Typical examples of prior art systems for automatically maintaining a beam of light along a horizontal axis are illustrated in Mason et al, U.S. Pat. No. 3,729,266 issued Apr. 24, 1973, entitled APPARATUS FOR AUTOMATICALLY DIRECTING AND MAINTAINING A BEAM OF ELECTROMAGNETIC RADIATION RELATIVE TO EARTH HORIZONTAL; Bird et al, U.S. Pat. No. 3,748,041 issued July 24, 1973, entitled LASER BEAM ATTITUDE CONTROL DEVICE; and Zoot, U.S. Pat. No. 3,684,381 issued Aug. 15, 1972, entitled LASER BEAM PLANAR REFERENCE.

Each of the above-referenced patents, however, while providing means for attaining self-leveling of a horizontally projected laser beam suffer from one or more inherent drawbacks. Typically, in the gimbal-mounted systems, a series of lenses is required and some form of interconnection must be provided between the several lenses to provide the necessary compensation to correct for the additive effects of the angles of incidence and reflection. Alternately, as in the case of Zoot, no such correction is made and special outside compensation means as a prism must be provided. In addition, none of these systems readily lend themselves to a simple modification wherein the output therefrom can be used to project a horizontal plane, a vertical plane, a sweeping horizontal plane, nor can they be conveniently adapted for projection of a beam along a horizontal plane in a conventional manner.

SUMMARY OF THE INVENTION

The self-leveling laser beam projector of the present invention includes a housing member containing a power supply, a light source, and a lens system having at least one lens pendulously mounted. If desired, a pentaprism may be rotatably arranged at the output end of the projector. The entire assembly is adapted for generally vertical mounting as on a tripod or the like to project a light beam vertically upwardly through a pendulously mounted inner lens and an outer lens assembly and through the pentaprism where it is turned 90° for projection along a horizontal plane. The pendulous mounting of the inner lens within the housing provides self-alignment of the beam output if the vertical mounting of the housing is disturbed. The inner lens is mounted in a pendulum suspended at its upper end or top in a pair of gimbal rings about mutually perpendicular axes for 2° of freedom. The connection between the housing and the gimbal rings is through conventional bearing means. The outer lens is fixed to the housing through openings provided in the sides of the pendulum frame and is fixed at a predetermined position intermediate the gimbal suspension and the inner lens.

In operation, when the housing and the light source are moved with respect to the vertical, the pendulous mounting of the inner lens allows it to maintain its vertical orientation. As a result, a light beam from the source is refracted by the inner lens and directed through the outer lens where it is again refracted and returned to the vertical and through the pentaprism. The output at the pentaprism, therefore, remains properly oriented at the horizontal. The pentaprism may include a drive means for rotating the pentaprism through an arc to provide a sweeping horizontal output beam. In yet another aspect of the invention, the pentaprism is removable from the output of the end of the housing to provide an upwardly directed true vertically projected light beam which may be used as an extremely accurate plumb or reference line. Means are also provided within the housing adjacent the free end of the pendulum such that the housing may be positioned horizontally and a positive stop is provided for the pendulum whereby the beam projector may be utilized to project a horizontal light beam in a conventional manner.

The many objects, advantages, and other aspects of this invention will be readily understood by those who are skilled in the art upon reading the following specification with reference to the accompanying drawings.

BRIEF DESCRIPTION OF THE DRAWINGS

FIG. 3 is a cross-sectional view similar to FIG. 2 showing the self-leveling pendulum assembly of the invention removed from the housing;

FIG. 4 is a top plan view taken generally along the plane IV—IV of FIG. 1 with the rotating pentaprism assembly removed for clarity;

FIG. 11 is a simplified schematic illustration of the lens and pendulum mounting system; and FIG. 12 is an enlarged, front elevation of the rotating pentaprism assembly of FIG. 1 positioned at the output end of the projector apparatus.

DESCRIPTION OF THE PREFERRED EMBODIMENT

Figure 1:
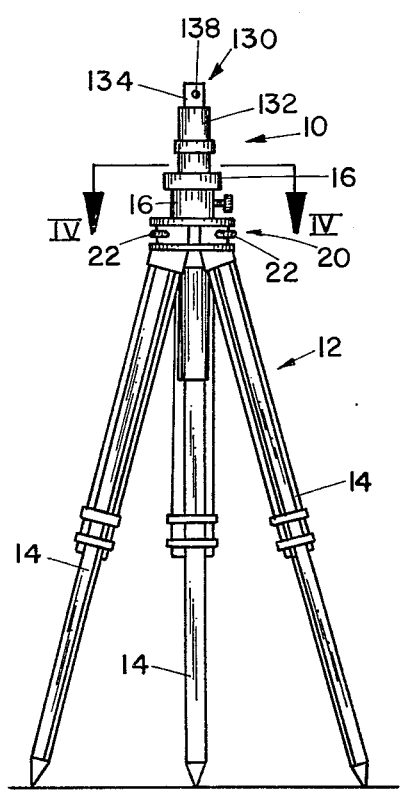
FIG. 1 is a perspective view illustrating the self-leveling projector apparatus mounted in a tripod.

Referring now to the drawings, and in particular to FIGS. 1–4, the self-leveling laser apparatus of the invention is generally designated by the numeral 10. The laser apparatus is adapted for mounting in a conventional tripod assembly 12 (FIG. 1) having a plurality of legs 14. A mounting ring 16 (FIG. 4) having level indicator means 18 is secured to the outer housing of laser assembly 10 and is used to indicate and obtain preliminary vertical adjustment of the laser assembly when mounted in the tripod. The upper portion of tripod 12 is equipped with a conventional leveling assembly 20 having a plurality of adjusting screws 22 (two are shown while four are preferably spaced 90° apart). Adjusting screws 22 are threadably received in the leveling assembly for adjustment of the laser apparatus 10 on the tripod in a conventional manner, that is, by adjusting the screws until the level indicators 18 indicate that the assembly is vertically oriented.

The laser apparatus 10 includes an outer elongated tubular housing 24 (FIG. 2) in which is mounted a light source generator 26 and its associated power supply 25. A self-leveling assembly 27 is mounted within the housing 24 in an inner rail assembly 29. A pendulously mounted framework 28 (FIG. 3) is mounted in self-leveling assembly 27 and includes an inner lens assembly 30 and an outer or fixed lens assembly 32 at the output end 34 of outer housing 24 to allow the emergence of a light beam from light source generator 26.

Figure 5:
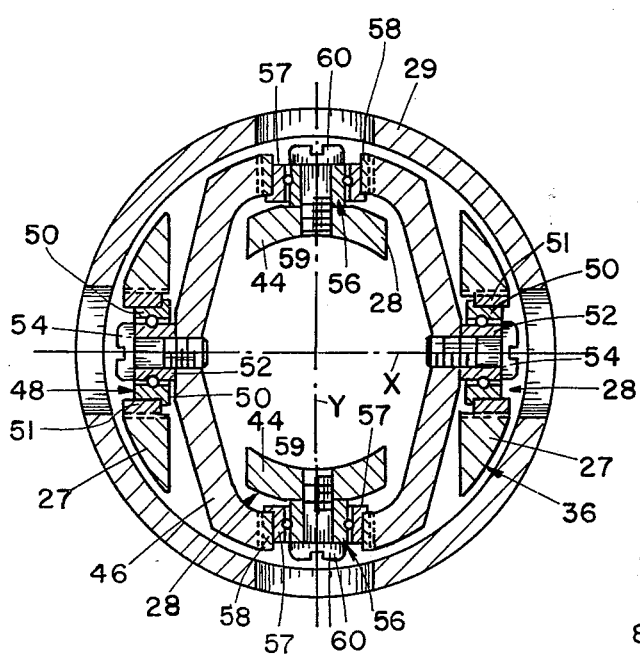
FIG. 5 is an enlarged, cross-sectional view taken along the plane V—V of FIG. 3 illustrating the gimbal mounting of the pendulum on which the inner lens is mounted.
Figure 2:
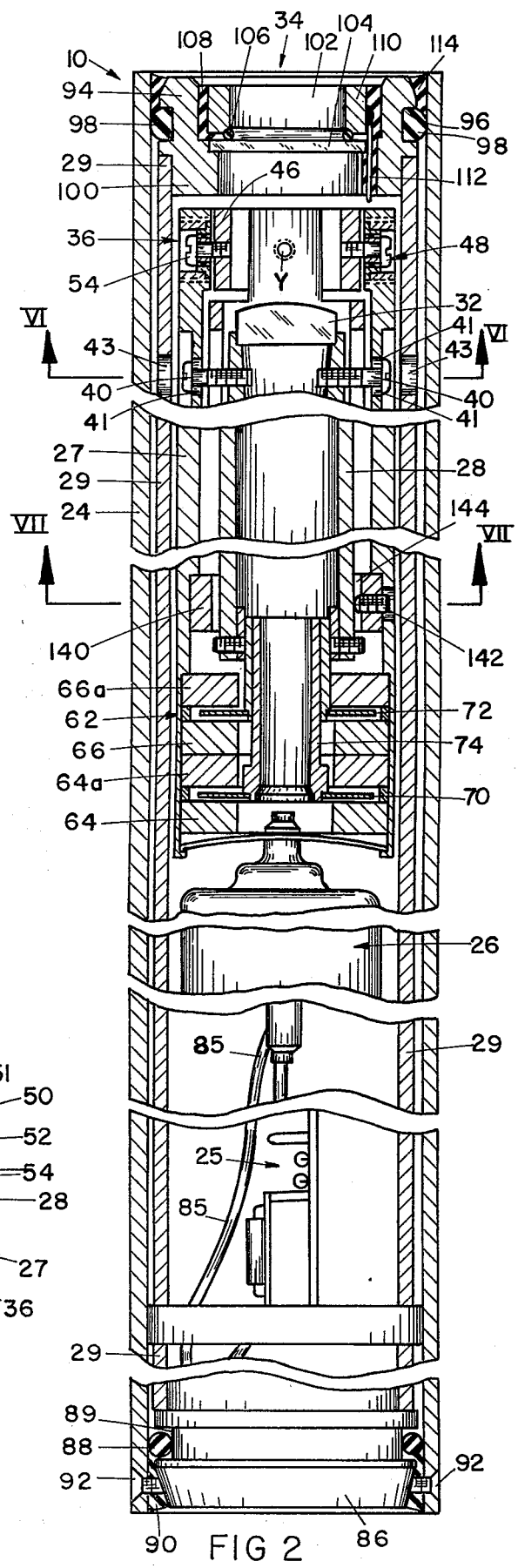
FIG. 2 is a fragmentary, cross-sectional view of the self-leveling projector of the invention.

Self-leveling assembly 27 including the pendulously mounted framework 28 for inner lens 30 is mounted in a gimbal ring assembly 36 (FIG. 5). Gimbal assembly 36 provides freedom of movement about mutually perpendicular axes such that inner lens 30 is free to maintain a vertical position with respect to gravity as will be further described hereinafter.

Figure 6:
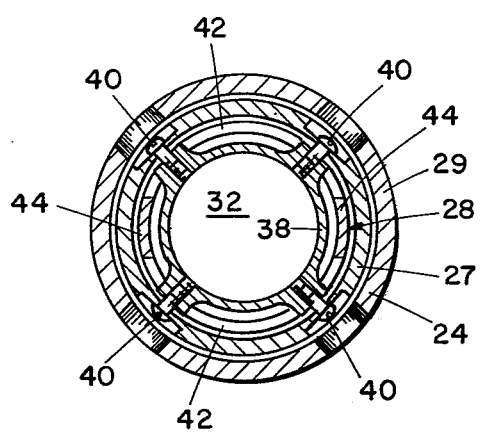
FIG. 6 is a cross-sectional view taken along the plane VI—VI of FIG. 2 illustrating the mounting of the outer or fixed lens within the housing.

As best illustrated in FIGS. 3 and 6, the outer or fixed lens 32 is secured in an annular holder member 38 which in turn is secured to the self-leveling assembly 27 by a plurality of screws 40. Screws 40 are arranged at 90° to each other and may be turned in or out with respect to the frame as required to center and adjust lens 32 with respect to the housing and light source 26. Screws 40 pass through cut-out open side portions 42 of the pendulum frame. Slots 41, extending along the side wall portions of self-leveling assembly 27 through which screws 40 pass, are provided to allow axial adjustment of lens 32. Access openings 43 are provided in inner rail 29 for adjustment of screws 40.

The pendulum frame 28 is an elongated tubular member having a pair of ears 44 (FIG. 5) extending from its upper end and forming the means by which the pendulum frame 28 is suspended for freedom of movement within self-leveling assembly 27 on gimbal assembly 36.

Referring to FIG. 5, gimbal assembly 36 is shown in greater detail in cross section. A gimbal ring 46 is pivotally mounted in leveling assembly housing 27 by means of a pair of opposed antifriction bearings 48. The outer races 50 of bearings 48 are fixed in a conventional manner to the walls of self-leveling assembly 27 by means of a threaded ring 51. The inner races 52 of bearings 48 abut gimbal ring 46 where they are secured by screws 54. Gimbal ring 46 is free to rotate about an axis "X" defined by a line passing through the axial center of bearings 48 and screws 54.

The pendulum is suspended about a second axis "Y" perpendicular to axis X in a similar manner. Bearings 56, positioned at 90° to bearings 48, are secured by their outer races 57 in gimbal ring 46 by a threaded ring 58. The inner races 59 abut the outer diameter surface portions of ears 44 on pendulum 28 and are secured thereto by means of screws 60. Accordingly, pendulum frame 28 is mounted for movement about mutually perpendicular axes X and Y.

The suspended pendulum frame 28 (FIG. 3), carries inner lens 30 for movement about axes X and Y to intercept the projected light beam B. The end of the pendulum frame opposite ears 44 is equipped with a damper assembly 62 serving to prevent excessive oscillation of the pendulum with movement of the laser assembly 10 as the pendulum seeks a vertical position.

Damper assembly 62 includes a plurality of paired annular magnets 64–64a and 66–66a. The magnet pairs 64 and 66 are annular magnets of conventional construction each preferably having eight equally spaced poles formed on their facing surfaces. Annular spacers 68 provided between the faces of each magnet pair form an air gap 69 between the magnet faces to receive a pair of damping discs 70 and 72 movable with the pendulum.

A damping disc holder 74 is secured by set screws 76 to the end of pendulum 28. Damping disc holder 74 has an axial opening through its center to allow passage of light beam B from the generator and along the length of the assembly. The outer surface of disc holder 74 is configurated to receive and secure damping discs 70 and 72. The damping discs are annular washer-like rings extending transverse to holder 74 into the air gap 69 between the faces of the paired magnets 64 and 66. The damping disc is preferably formed of a soft copper alloy and reacts with the magnetic lines of force between the poles of the magnets to prevent excessive oscillation of the pendulum during its movement when returning to a vertical position with movement of the laser assembly 10 from vertical.

Inner lens 30 is fixed in a lens holder 77 which in turn is secured within the pendulum framework 28. Lens 30 is secured, as by cementing, in position within holder 77 on an annular lip 79 formed in the inner diameter of holder 77. Holder 77 is adjustably slidably mounted within pendulum frame 28. The outer diameter of holder 77 corresponds closely to the axial inner diameter of pendulum frame 28. Access openings 78 provided in the walls of self-leveling assembly 27 allow access to a series of set screws 80 (only one is shown) threadably received in the side wall of pendulum frame 28 to bear against holder 77. Additional access openings 81 and 82 in self-leveling assembly 27 and the side wall of pendulum frame 28 are provided to allow insertion of a tool (not shown) into opening 83 formed in the side wall of lens holder 77 such that when set screws 80 are loosened, holder 77 may be axially adjusted along the length of pendulum frame 28. Once the adjustment is accomplished, set screws 80 are tightened to secure the lens holder and prevent movement axially along the pendulum.

Adjustment of the damper assembly 62 is similarly made by loosening set screws 76 and sliding the damper assembly axially along pendulum frame 28 such that damping discs 70 and 72 are equally spaced within air gap 69 between paired magnets 64 and 66.

After assembly, the self-leveling assembly 27 of FIG. 3 is fixed in inner rail 29 and placed within outer housing 24 where it is secured together with generator 26 and its associated power supply 25. Rear end cap assembly 86 (FIG. 2) forms the electrical terminal by which electrical connection is made to the interior of the housing via wires 85. Rear cap 86 is secured to both the outermost end of inner rail 29 and the inner diameter of outer housing 24. An O-ring 88, positioned within a groove 89 in the end cap assembly, abuts the inner diameter of outer housing 28. A rubber-like sealing compound 90 is poured between the outer chamfered end of end cap 86 and the inner diameter of outer housing 24. Finally, a number of screws 92 extend through outer housing 24 and are threadably received in the outer diameter of end cap 86 to secure the end cap in position.

At the opposite end of the tubular member, a front end cap 94 similar in outer configuration and having a groove 96 provided about its outer diameter is positioned. An O-ring 98 is positioned in groove 96 for sealing engagement with the inner diameter of the outer housing 24. An inner annular lip 100 fits into the inner diameter of inner rail 29. An axial opening 102 is provided through the front end cap 94 and a window 104 is positioned in the axial opening. Window 104 is held in position within axial opening 102 by an O-ring 106 and a rubber-like sealant 108. An electrically conductive slip ring assembly 110 is also positioned within the inner diameter of opening 102 adjacent the outermost end of front end cap 94 to provide electrical connection to a rotatable pentaprism assembly 130 (FIGS. 1 and 12) as will be hereinafter described. Suitable electrical lead wires 112 are connected to slip ring 110 and pass through an opening in annular lip 100 and to power supply 25 to provide the necessary power for the rotating pentaprism assembly. Finally, front end cap assembly 94 is secured within the outer housing 24 by an additional quantity of sealant 114 about its chamfered outer end and the inner diameter of outer housing 24. When sealed at the front and rear end caps, the entire self-leveling assembly and light source generator are contained within a completely sealed enclosure. The light beam output B from the light generator 24 is directed through inner lens 30, outer lens 32 and window 104 where it is emitted from the outer housing for utilization in leveling, surveying, and like purposes.

Figure 8:
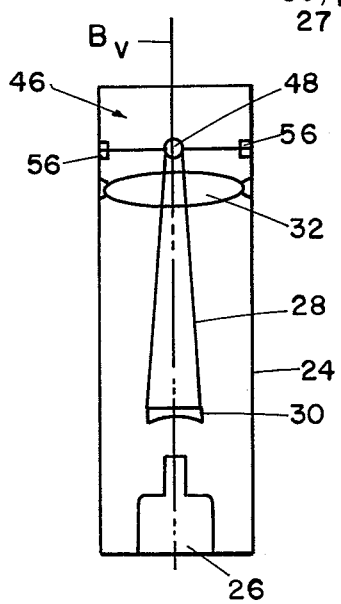
FIGS. 8 and 8a are schematic illustrations showing the operation of the lens system of the invention in simplified form.
Figure 8A:
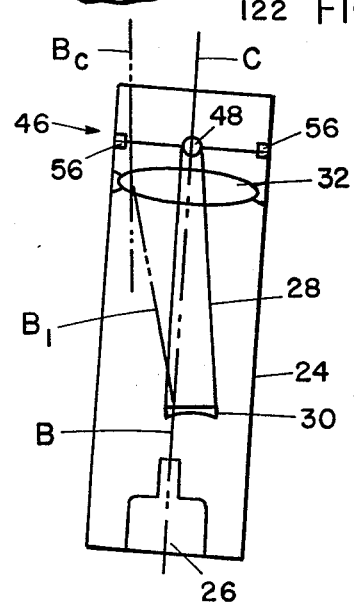

The operation of the self-leveling light beam generator is dependent, of course, upon the gimbal mounting of the pendulum frame and inner lens and is best understood with reference to the simplified schematic illustrations of FIGS. 8 and 8a. In these figures, only those components necessary to an understanding of the pendulum mounting and lens system of the invention are illustrated. Basically, the outer housing 24 is shown having light source 26 and the outer lens 32 fixed therein. Pendulum frame 28 is fixed at its upper end in bearings 48, 56, and in gimbal 46. In the vertically aligned position of FIG. 8, light beam B is directed along a vertical path through the center of inner lens 30, along the center line of the housing, and through the center of outer lens 32 where it is projected from the housing for utilization. Upon movement of housing 24 and light source 26 from the vertical as illustrated in FIG. 8a, beam B is projected along the horizontal center line of the housing until it strikes the inner lens 30 which has maintained its vertical orientation because of its pendulous mounting about bearings 48 and 50. Beam B passes through lens 30 and is bent or refracted as illustrated at B and is directed into outer lens 32 where it is again refracted and returned to the vertical as illustrated at Bc. The output beam Bc, therefore, is corrected and returned to a true vertical position. It will be noted that the corrected beam Bc is offset slightly from the actual center line C of the fixed outer lens although it remains accurately vertically oriented. This offset is of a relatively insignificant amount and normally is ignored.

While pendulous suspension of both inner and outer lenses may be provided to obtain a self-leveling of the laser apparatus, it is preferable to pendulously suspend only the inner lens and additionally to pivot the pendulum at a point about axes X and Y at a point above the fixed inner lens 32 as described above. A preferred lens system and the mathematics by which the preferred distance of the fixed lens 32 from the mounting point (axes X-Y) of the pendulum is illustrated in detail in FIG. 11.

As illustrated in FIG. 11, inner lens 30 is a plano concave lens and in one embodiment, has a focal length of 13.1 mm. Outer lens 32 is a convex lens having a 132 mm focal length. The pivot point defined by line X-Y corresponds to the axes X and Y of the gimbal assembly 36 mounting the pendulum 28 as shown in the previous figures. Length D (from axes line X-Y to the lower surface of lens 32) corresponds to the location of the inner surface of fixed outer lens 32 with respect to the pivot point X-Y. To solve for distance D such that the angles of the emerging light beams Bv = Bc illustrated in the figure are such that $\theta_2 = \theta_3$. Inner lens 30 is shown in two positions in the drawing. The first, or solid, illustrates the beam from the light source generator with the inner and outer lenses and housing in vertical alignment (projecting the beam Bv). The dotted portion illustrates the inner lens 30 in the position assumed by inner lens 30 with respect to the source generator when the housing with respect to the vertical (and the inner lens 30) has been moved a distance indicated by the dimension y (to project the corrected beam Bc). This angular relationship through the center of lens 32, therefore, is equal to the angle identified by $\theta_1$. The angle identified as $\theta_2$ is, of course, equal to $\theta_1$. The line indicating a vertical beam is projected through the center of lenses 30 and 32 is identified as Bv. The corrected beam Bc results when the vertical is offset the distance y. To solve for dimension D such that the corrected light beam angle $\theta_3 = \theta_1$ is as follows. It being known that angles $\theta_2$ and $\theta_3$ are equal, $$\tan \theta_2 = \frac{y}{f_1} \qquad \tan \theta_1 = \frac{y}{l_1 + x - f_2}$$

for $\theta_1 = \theta_2$ $\qquad \tan \theta_2 = \tan \theta_1$ $$\therefore \frac{y}{f_1} = \frac{y}{l_1 + D - f_2}$$

$$f_1 = l_1 + x - f_2$$

$$x = f_1 + f_2 - l_1$$

-continued $$l_1 = -f_1 \frac{-N-1}{N} \cdot \frac{df_1}{r_2}$$ where $N =$ index of refraction;

$f_1 = -$ for positive inner lens (30);
$r = -$ for convex lens (32); and
$r_1 \approx r_2$ $$\therefore D = f_1 + f_2 - l_1$$

$$= f_2 - \left(\frac{N-1}{N}\right)\frac{df_1}{r_2}$$

In the specific example shown:
$d = 0.35$ inch
$r_2 + 86$ mm $= 3.3$ inches
$f_2 = 13$ mm $= 0.51$ inch $$D = .51 + \frac{(.65)(.35)(5.2)}{(1.65)(3.3)}$$

$D = 0.51$ inch $+ 0.22$ inch
$D = 0.73$ inch for 13 mm lens (30)

Accordingly, for the vertically corrected beam Bc to be equal to the originally vertically projected beam by the inner facing surface of lens 32 is positioned 0.73 inches below the point (axes X–Y) at which pendulum frame 38 is suspended.

Figure 9:
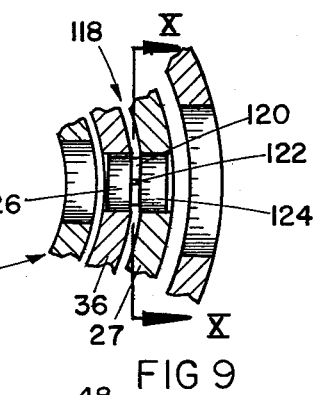
FIG. 9 is a fragmentary, cross-sectional view illustrating an alternate mounting for the pendulum.
Figure 10:
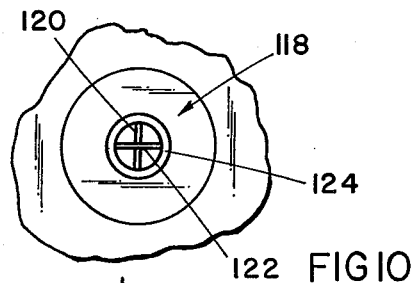
FIG. 10 is a cross-sectional view taken along the plane X—X of FIG. 9.

An alternate mounting arrangement for the gimbal and pendulum is illustrated in the fragmentary views of FIGS. 9 and 10. In this case, a spring-type suspension 118 is utilized in place of the bearings 48 and 56 previously described between the pendulum frame 28 and gimbal 46 and between the gimbal and self-leveling housing assembly 27. Spring suspension 118 is conventional and includes a pair of crossed ribbon-like metallic elements 120 and 122 having a known spring rate. Elements 120 and 122 are fixed at their ends in mounting members 124 and 126 which in turn are fixed in the openings provided in ears 44, gimbal 36, and in self-leveling housing 27. Spring suspension 118 of FIGS. 9 and 10 shows only the suspension of gimbal 36 within self-leveling assembly housing 27. It is understood, however, that additional similar assemblies are also positioned between gimbal 36 and ears 44 of the pendulum. This type of spring suspension, having a known spring rate, provides a support for the pendulum with a minimum of friction and may be used conveniently in place of the antifriction bearings.

The apparatus thus far described provides a self-adjusting, vertically projected collimated light beam. To produce a self-leveling horizontal beam output, mirrors, a pentaprism or other optical devices are utilized at the output end 34 of laser assembly 10. Preferably, a rotating pentaprism arrangement is utilized to provide a level horizontal beam output. The prism assembly, generally identified by the numeral 130 in FIG. 1, is also shown in FIG. 12. The rotating prism assembly 130 includes an annular base housing 132 adapted for mounting at the output end 34 of laser assembly 10. An upper housing 134 is rotatably mounted on base 132 and is adapted to be rotated about an axis in alignment with the center line of laser assembly 10 by means of a drive mechanism as an electric motor (not shown) contained within base 132. Electrical power connections are made to the motor within base 132 by means of the previously described slip ring assembly 110 (FIG. 2) in a conventional manner. The rotatable upper housing 134 contains a pentaprism 136 rotatable with upper housing 132 about the axis of the light beam. Pentaprism 136, well-known to those skilled in the art, is an optical reflective device in which the laser beam, when directed therein, is reflected at a fixed angular relationship of exactly 90° to the direction of incidence. Accordingly, the beam Bv or the vertically corrected beam Bc directed through the lens system and the output end 34 of laser assembly 10, is reflected by the pentaprism outwardly at exactly 90° through an opening 138 in the side of upper housing 134 to form a horizontal beam Bh. As the pentaprism rotates, the sweeping horizontal beam of light Bh is, therefore, projected horizontally therefrom. Upon deviations of the vertical mounting of the laser assembly, the beam is returned to the vertical by the pendulum and lens system and to the pentaprism to maintain its horizontal orientation. Such rotating pentaprism assemblies are known to those skilled in the art and are commercially available from Laser Alignment, Inc. of Grand Rapids, Michigan, Part. No. 30300.

Figure 7:
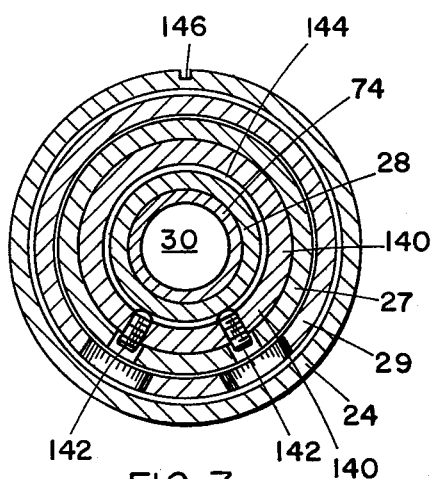
FIG. 7 is a cross-sectional view taken generally along the plane VII—VII of FIG. 2 illustrating the means for holding the pendulum when the light beam projector is used in a horizontal orientation.

Referring again briefly to FIG. 3 and additionally to the cross-sectional view of FIG. 7, an outer limit stop 140, annularly positioned about the inner diameter of the self-leveling housing 27 and surrounding pendulum frame 28 is spaced a slight distance from pendulum frame 28 to allow swinging movement thereof. Stop 140, however, prevents excessive movement of pendulum frame 28 thereby preventing damage to damping discs 70 and 72 with movement of the pendulum. A pair of angularly positioned, spaced apart abutment members 142 are threaded through stop 140, as illustrated in FIG. 7, and extend slightly into a space 144 between stop 140 and pendulum frame 28. The abutment members 142 are formed from round point set screws and hold the pendulum frame in a relatively fixed position when the laser assembly 10 is positioned in a horizontal orientation. When the laser assembly is horizontally positioned, pendulum frame 28 seeks a rest position on abutment members 142 and by its weight, is prevented from moving about its gimbal axis. Accordingly, the laser assembly 10 previously described can be removed from tripod 12 and used to project a horizontal output beam in a conventional manner without reliance on the self-leveling feature. This adds greatly to the versatility of the instrument as the horizontally oriented laser can be positioned in a supporting framework of conventional construction and used in a conventional manner with or without the rotating pentaprism fixed at its output end. A line or groove 146 (FIG. 7) is scribed on the outer housing surface at a point directly opposite abutment members 142 to insure that when used in a horizontal position, pendulum frame 28 will rest on abutment members 142.

Having thus described the invention, those skilled in the art will immediately appreciate the many advantages of the self-leveling laser assembly. The invention provides a new and useful self-leveling laser assembly which does not suffer from the drawbacks of the prior art systems. The many lenses, gimbals and like compensating mechanisms are completely eliminated and in addition, there is provided a laser system which can be used to provide both a self-adjusting vertical line or a self-leveling horizontal line. The laser system of the invention is further adapted to project a horizontal beam in a conventional manner thereby adding significantly to the versatility of the instrument and allowing the use of a single laser instrument for many surveying and like applications.

The embodiments of the invention in which an exclusive property or privilege is claimed are defined as follows.

1. Self-leveling light beam projector apparatus for projecting and maintaining a beam of light along a predetermined path relative to the earth's vertical comprising: a housing adapted for mounting in a generally vertical plane; means in said housing for generating a beam of collimated light along a predetermined path relative to the longitudinal axis of said housing and emitting same through an exit end thereof, said exit end being located at an upper end of said housing when vertically mounted; first and second lens means in said housing for directing said light beam along said predetermined path; means in said housing mounting said first lens means for movement about mutually perpendicular axes in the path of said light beam along said axis of said housing, said mounting means including a pendulum mounted in said housing; gimbal means adjacent said exit end mounting said pendulum for movement about said mutually perpendicular axes, said second lens being fixed with respect to said housing for movement therewith, said first and second lenses being disposed along the axis of said housing to direct said emitted light beam along said predetermined path toward said exit end, whereby movement of said housing affecting said beam of light projected along said predetermined path is corrected by said first and said second lens for projection of said emitted beam along said predetermined path and through said exit end.

2. The light beam projector apparatus of claim 1 wherein said first lens is concave and said second lens is convex, said first lens intercepting said light beam along said predetermined path and angularly displacing said beam with respect to said housing, said second lens intercepting said angularly displaced beam and directing said emitted beam along said predetermined path.

3. The light beam projector apparatus of claim 2 wherein said pendulum is mounted for movement about mutually perpendicular axes in gimbal means, a first one of said mutually perpendicular axes being mounted with respect to said housing and the second one of said mutually perpendicular axes being mounted transverse to said first axis on said pendulum.

4. The light beam projector apparatus of claim 3 wherein said second lens is disposed between said first lens and said gimbal means.

5. The light beam projector apparatus of claim 1 and further including reflector means mounted adjacent said exit end of said housing for bending said emitted beam of light through an angle of 90° for projection along a horizontal plane.

6. The light beam projector apparatus of claim 5 and further including means rotatably mounting said reflector means for rotation about said vertical axis to thereby provide a sweeping horizontal plane of light.

7. The apparatus of claim 6 wherein said reflector means is a prism.

8. The apparatus of claim 6 wherein said reflector means is a pentaprism.

9. The apparatus of claim 3 and further including cooperating damping means on said housing and said pendulum, said damping means preventing excessive oscillation of said pendulum with movement of said housing.

10. The apparatus of claim 9 and further including beam directing means positioned adjacent said output end for directing said beam along a horizontal path.

11. The apparatus of claim 10 wherein said beam directing means includes a pentaprism and further including means for rotating said pentaprism to thereby provide a sweeping horizontal beam of light.

12. Self-leveling light beam projector apparatus comprising:

a housing having a light beam generator mounted therein, said housing being adapted for generally vertical mounting and having an upper end thereof adapted to allow the emergence of a beam of light from said generator;

first and second lens means in said housing adapted to direct said beam of light from said source through said upper end; and pendulous mounting means mounting said first lens for movement with respect to said source, said pendulous mounting means including an elongated frame member supporting said first lens adjacent said source, said frame member including means adjacent said upper end mounting said frame member for movement about mutually perpendicular axes with respect to said housing; means fixing said second lens with respect to said housing at a position intermediate said first lens and said upper end; said mounting means being adapted to assume a predetermined position with respect to the vertical wherein said beam directed to said first lens is directed through said second lens and is emitted at said upper end in a vertical path with deviations of said housing from the vertical.

13. The apparatus of claim 12 and further including cooperating damping means on said housing and said pendulous mounting means, said damping means preventing excessive oscillation of said pendulous mounting means with movement of said housing.

14. The apparatus of claim 13 and further including beam directing means positioned adjacent said output end for directing said beam along a horizontal path.

15. The apparatus of claim 14 wherein said beam directing means includes a pentaprism.

16. The apparatus of claim 15 and further including means for rotating said pentaprism to thereby provide a sweeping horizontal beam of light.

17. The apparatus of claim 12 wherein one of said first lens and said second lens is concave and the other of said first and said second lens is convex.

18. The apparatus of claim 17 wherein said first lens is concave.

19. The apparatus of claim 18 wherein said source is a laser beam generator for providing a collimated beam of light output.

20. The apparatus of claim 13 wherein said damping means includes permanent magnet means mounted on one of said housing and said pendulous mounting means.

* * * * *

UNITED STATES PATENT AND TRADEMARK OFFICE
CERTIFICATE OF CORRECTION

PATENT NO. : 3,936,197
DATED : February 3, 1976
INVENTOR(S) : Larry D. Aldrink, Edward G. Nielsen, Willard G. Vogelaar It is certified that error appears in the above-identified patent and that said Letters Patent are hereby corrected as shown below:

Column 7, lines 9-12;

Formula should read as follows:

$$\therefore D = f_1 + f_2 - 1_1$$
$$= f_2 + \left(\frac{N-1}{N}\right) \frac{df}{r_2}_1$$

Column 7, lines 18-20;

Formula should read as follows:

$$\therefore D = .51 + \frac{(.65)(.35)(5.2)}{(1.65)(3.3)}$$

Signed and Sealed this

*eleventh* Day of *May 1976*

[SEAL]

Attest:

RUTH C. MASON
*Attesting Officer*

C. MARSHALL DANN
*Commissioner of Patents and Trademarks*